Patented Sept. 8, 1936

2,053,273

UNITED STATES PATENT OFFICE 2,053,273

DYESTUFFS OF THE ANTHRAQUINONE SERIES AND METHOD OF MAKING THE SAME

George Holland Ellis and Frank Brown, Spondon, near Derby, England, assignors to Celanese Corporation of America, a corporation of Delaware No Drawing. Application February 7, 1933, Serial No. 655,614. In Great Britain February 17, 1932

12 Claims. (Cl. 260—59)

This invention relates to the manufacture and application of new dyestuffs of the anthraquinone series, which dyestuffs are more particularly of value for the colouration of cellulose ester and ether materials.

The amino and simple alkylamino derivatives of anthraquinone, for example 1:4-dimethylamino anthraquinone, are of value for the colouration of cellulose ester and ether materials in that by their aid it is possible to secure, by direct dyeing methods, shades of blue difficult to secure by means of other dyestuffs. Many of these dyeings, however, while reasonably fast to most of the agencies which textile materials are commonly required to withstand, suffer from a lack of resistance to the combined action of light and acid, for instance combustion products of coal gas. This lack of resistance is particularly objectionable in that in general it involves a considerable change in shade towards red and not merely a reduction in the intensity of the dyeing. It may be said that in this respect no really satisfactory direct blue dyestuff for cellulose ester and ether materials is as yet available. Thus, many arylamino anthraquinones, though offering very considerable resistance to the action of acid fumes in the presence of light, have such low affinity for the material as to render them commercially valueless except possibly for the production of pale shades. 1-oxy-4-phenylamino anthraquinone for instance, is extremely resistant to acid fading, but is very red in shade and at the same time is lacking in affinity.

We have now found that derivatives of anthraquinone containing in one α-position a hydroxyl group, in a second α-position an amino or non-aromatically substituted amino group and in a third α-position an arylamino group, constitute very valuable colouring matters for cellulose ester and ether materials.

The new dyestuffs of the present invention may be represented by the following formula:—

wherein A represents anthraquinone substituted in three α-positions by substituents of which X represents a hydroxyl group, Y an aryl substituted amino group, and Z a free amino group or an amino group substituted only by aliphatic or other residues such that carbon of an aromatic nucleus if present therein is not directly attached to the amino nitrogen. By means of dyestuffs of this series, more particularly by dyestuffs of the above formula in which the arylamino group is in a para-position to either the hydroxyl group or the other amino group, especially the latter, blue shades of exceptional resistance to the usual agencies may be obtained. For example 1-amino-4-phenylamino-5-hydroxy anthraquinone dyes cellulose acetate material in pure blue shades of excellent fastness both to light and to light in the presence of acid fumes such as combustion products of coal gas. Coupled with these valuable properties the dyestuff displays very good affinity for the material. By shading with small quantities of red and yellow dyestuffs very desirable navy blue shades may be obtained.

The aryl substituent of the arylamino group may be of any desired character, for example of the benzene, naphthalene or other series, but is preferably of the benzene series. It may be substituted in any desired manner. Thus, for example, it may contain alkyl, hydroxy, alkoxy, amino, halogen or other substituents. Special reference may be made to the presence of acidylamino groups, which may increase the affinity of the dyestuff for the material. Again, increased affinity may be imparted by the presence of an alkyl group or other substituent in the meta-position to the amino group, and alkyloxy groups especially in the ortho-position to the amino group may be present, whereby a still further increase of resistance to acid fading may be secured. The second hydrogen atom of the aryl substituted amino group may also be substituted, for example by means of an alkyl or other aliphatic residue. When present, substituents of the amino group Z of the anthraquinone derivatives may be of any desired character provided that the amino nitrogen is not directly attached to carbon of an aromatic nucleus of the substituent. As examples of suitable substituents mention may be made of methyl or ethyl or other alkyl groups, substituted alkyl groups, for example hydroxy-ethyl, hydroxy-propyl or γ-chlor-β-hydoxy-propyl, aliphatic acidyl groups for example acetyl, hydrogenized aromatic residues for example cyclo-hexyl or substituted cyclo-hexyl groups, and aralkyl groups or hydrogenized aralkyl groups for example benzyl or hydrogenized benzyl residues. If desired the substituent may be united at two points to the amino nitrogen so as to form a heterocyclic residue, as an example of which may be mentioned the piperidyl group. All of the above substituents are in fact aliphatic in character and are so referred to in the appended claims. Two separate substituents may be present in the amino group in question, if desired. Most satisfactory results have been obtained when the amino group is either unsubstituted or substituted only by methyl, ethyl or other aliphatic residue of relatively low molecular weight.

These new dyestuffs which, particularly when intended for application to cellulose esters or ethers are preferably unsulphonated, may be produced in various ways. More particularly, they may be produced from anthraquinone compounds substituted in the 1:4:5-positions by reactive atoms or groups by replacing the said reactive atoms or groups by, or converting them into, the desired hydroxyl, amino or arylamino groups, as the case may be. It will be appreciated that the parent compounds may already contain one or other of the desired groups in the appropriate position in the nucleus and in such case it may only be necessary to replace one or two replaceable atoms or groups by hydroxyl, amino, or arylamino groups. Other parent materials may comprise compounds containing the desired hydroxyl, amino, and substituted amino groups in the required position and in addition other groups, for example sulphonic groups, which may be readily eliminated in order to obtain the desired compounds.

The production of the new dyestuffs, which, as indicated previously are of the general formula

wherein A represents anthraquinone substituted in three α-positions by three substituents X, Y and Z of which X represents a hydroxyl group, Y an arylamino group, and Z a free amino group or an aliphatically substituted amino group as hereinbefore defined, thus comprises essentially treating anthraquinone substituted in one α-position by one of the groups X, Y and Z, in another α-position by another of the groups X, Y and Z, and in a third α-position by a replaceable or convertible atom or group, so as to replace by or convert into the remaining one of the groups X, Y and Z the said replaceable or convertible atom or group.

As examples of replaceable or convertible atoms or groups, mention may be made of sulphonic groups, hydroxyl alkoxy and aryloxy groups, nitro groups, amino and substituted amino groups, and chlorine or other halogen atoms. Sulphonic groups may, for instance, be converted into hydroxyl groups by the action of alkalies, particularly weak alkalies such as milk of lime or solutions of alkali carbonates, or into amino or substituted amino groups by the action of ammonia or the corresponding substituted ammonias. Hydroxyl or alkoxyl groups may similarly be converted into amino groups or substituted amino groups by the action of ammonia or aliphatic or aromatic amines. Nitro groups may, for instance, be converted into amino groups by reduction, or into substituted amino groups by direct reaction with aliphatic or aromatic amines. The hydrogen of amino groups may be substituted by acyl or hydrocarbon or other radicles by the action of appropriate acylating, alkylating or aralkylating or other agents. Chlorine and other halogen atoms may readily be converted into hydroxyl groups by the action, for instance, of concentrated sulphuric acid, especially in the presence of boric acid, or by the action of alkalies, especially weak alkalies such as calcium hydroxide. Again, they may be converted into amino groups or substituted amino groups by reaction with ammonia or substituted ammonias. One convenient method of replacing halogen atoms by amino groups is to condense the halogen compound with an arylsulphonamide or phthalimide and then to saponify the arylsulphoamido or phthalimido compounds so obtained.

The replacement of hydroxyl groups by amino or hydroxyl and amino groups by substituted amino groups by the direct action of ammonia or substituted ammonia may frequently be facilitated by first reducing the anthraquinone compound to a leuco derivative.

Such is especially the case when compounds contain hydroxyl or hydroxyl and amino groups in the 1:4-positions. The amidation of reduced hydroxy anthraquinone compounds may, if desired, be effected in the presence of inorganic alkali in the manner described in U. S. Patent No. 1,969,748.

The replacement of hydroxyl groups by arylamino groups by the action of aromatic amines may advantageously be effected in the presence of boric acid or other similarly acting agents.

As examples of suitable parent materials containing reactive groups mention may be made of the following:—4-nitro or 4-amino chrysazin, 4-nitro or 4-amino anthrarufin, 1:4-diamino-5-oxy-anthraquinone, 5-nitro-1:4-dioxy anthraquinone, 1-amino-4-oxy-5- or 8-sulpho anthraquinone, 5-sulpho-1:4-dioxy anthraquinone, 1:4:5-trioxy anthraquinone, para-mono-chlor chrysazin or para-mono-chlor anthrarufin, 1:5- or 1:8-dichlor-4-amino anthraquinone and 1-amino-4-oxy-5- or 8-chlor anthraquinone.

It has been found particularly convenient to take a compound containing a hydroxyl group in one of the 1:4:5-positions and suitable substituents in the other two positions, and to replace the latter in succession, in either order respectively, by an arylamino group and an amino group or an aliphatically substituted amino group as hereinbefore defined. If of course one of the two substituents is already of the desired character, only the remaining one may require replacement.

Thus, for example, 1:4:5-trihydroxy anthraquinone, preferably in the form of a leuco compound, may be condensed with 1 molecular proportion of ammonia so as to replace only one of the para-hydroxyl groups, and the resulting product subjected to the action of aniline, para-toluidine or other aromatic amine in order to effect replacement of the other of the para-hydroxy groups. Again, 1-amino-4-hydroxy-5-sulpho anthraquinone may be subjected to the action of aniline so as to replace the hydroxyl group by an anilido residue and the 5-sulpho group subsequently replaced by hydroxyl, for example by the action of milk of lime under pressure.

It has been found however that para-amino or para-nitro chrysazin constitute particularly valuable parent materials for dyestuffs of the new series. Para-nitro chrysazin is readily obtainable by nitrating the boric ester of chrysazin in concentrated sulphuric acid solution. The crude product as thus obtained generally contains small proportions of isomeric and other bodies, but nevertheless may satisfactorily be used without further purification for the production of the new dyestuffs. The nitro group may be directly reduced to an amino group, preferably by means of alkali and glucose or other reducing sugar in aqueous solution, or by reaction of the nitro compound with an aliphatic amine the nitro group may be replaced by an alkylamino group. The resulting amino or alkylamino chrysazin may then be condensed with an aromatic amine as indicated previously. The condensation of paraamino chrysazin with aniline is conveniently effected by heating for about two hours at 175–180° C. in the presence of boric acid. The condensation may also be effected at lower temperatures, for example at 130–150° C. if a more prolonged period of heating is employed, for example about 20 hours.

The reaction appears to be greatly accelerated by the presence of iron, as for example when working in unlined iron vessels. We have for instance carried out the reaction under such circumstances in as little as 1½ hours without exceeding a temperature of 135° C.

In a similar manner isomeric colouring matter may be obtained from 4-nitro-anthrarufin or 5-nitro-1:4-dioxy-anthraquinone.

Dyestuffs of the present invention may also be produced by methods involving the synthesis or production of an anthraquinone residue. For example an appropriately substituted benzoylbenzoic acid may be subjected to ring closure.

The new colouring matters, as indicated above, are of especial value for the colouration of cellulose acetate and other cellulose ester or ether materials. As examples of such other esters and ethers reference may be made to cellulose formate, propionate or butyrate or the products obtainable by treating alkalized cellulose with esterifying agents, or the ethyl, benzyl or other ethers of cellulose. They may also be applied to mixed materials comprising one or more of the aforesaid cellulose esters or ethers in admixture with other textile fibres, for example wool, silk or other animal fibres, or cotton, regenerated cellulose or other cellulosic materials. Such other fibres may be coloured by the same dyestuffs as the cellulose esters or ethers when they possess the requisite affinity, or they may be coloured either in the same or different shades by means of other dyestuffs, either before, after or simultaneously with the colouration of the cellulose esters or ethers.

The said colouring matters may be applied to textile materials either in the reduced state, that is by a vat process or in the form of free leuco compounds in the manner described in U. S. Patent No. 1,900,172, or they may be applied in solution where sufficiently soluble, in aqueous suspension, or after being brought into colloidal form.

For convenience in application, the new colouring matters may be converted into concentrated or other preparations, whether liquid or solid or semi-solid, in which the colouring matters are present in the reduced or unreduced state and in colloidal, dispersed, or other finely divided condition. Such preparations are included within the scope of the invention and may be prepared for example, by grinding (e. g. in colloid mills), by dissolving in a solvent and mixing with water containing or not containing protective colloids and/or dispersators, or by treatment with dispersing agents whether alone or in the presence of protective colloids and/or liquids, e. g. water. Preparations intended for vatting may contain reducing agents, alkali or the like, e. g. alkali salts of hydroxy and polyhydroxy cyclic compounds (see U. S. Patent No. 1,716,720).

As examples of dispersing agents or protective colloids mention may be made of the following:—

Sulphoaromatic fatty acid compounds, e. g. sulpho-benzene palmitic acid compounds (see U. S. Patent No. 1,694,413).

Sulphoaromatic ricinoleic acid compounds, e. g. sulpho-naphthalene-ricinoleic acid (see U. S. Patent No. 1,840,572).

Naphthenic acids or other carbocyclic compounds containing salt-forming groups or salts of such acids or compounds (see U. S. Patent No. 1,618,414).

Sulphonated oil compounds, e. g. sulphonated castor oil.

Sulphuric esters of higher aliphatic alcohols.

Furfural-naphthalene sulphonic acid compounds (see U. S. Patent No. 1,928,647).

Resino-naphthalene sulphonic acid compounds (see U. S. Patent No. 1,959,352).

Formaldehyde naphthalene sulphonic acid compounds.

Alkyl-, cycloalkyl-, and aralkyl-naphthalene sulphonic acids.

Sulphite cellulose waste liquor or its constituents or products of transformation, e. g. lignin sulphonic acid compounds.

Sulphonic acid compounds of mineral oils, tar oils, brown coal tar oils, and the like, and their products of condensation with alcohols.

Sulphonic acid compounds of distillation residues of benzaldehyde.

Carbohydrates including gums.

Glue and gelatine.

By addition of or dilution with water, the aforesaid preparations containing unreduced unsulphonated colouring matters yield aqueous suspensions or colloidal solutions which may be directly employed for the colouration of cellulose acetate or other organic substitution derivatives of cellulose. The preparations containing reduced or unreduced colouring matters may be employed for the preparation of dye vats for the colouration of cellulose acetate or other organic substitution derivatives of cellulose or other textile materials.

The colouring matters may be applied to the materials in any desired manner, for example by dyeing or other method of uniform application, or by printing, stencilling or other method of local application. If desired the new colouring matters may be employed for the colouration of stannous chloride discharges in the manner described in U. S. Patent No. 1,949,413.

The invention is illustrated but not limited by the following examples:—

*Example 1*

1 part of 4-amino chrysazin (obtained by reducing 4-nitro chrysazin with caustic soda and glucose) is heated for two hours at 175–180° C., or for about 20 hours at 130–140° C., with 1 part of boric acid and 5 parts of aniline, the mixture being well stirred during the heating period. Upon cooling substantially pure 1-amino-4-phenylamino-5-oxy anthraquinone crystallizes out and is filtered off and freed from analine by washing first with a small amount of methylated spirit and then with water.

The new product is readily dispersible in water by means of Turkey red oil or other dispersing agent and from dispersions so obtained yields pure blue shades on cellulose acetate materials.

*Example 2*

Preparation of 1-amino-4-orthotolylamino-5-oxy-anthraquinone.

1 part of 1-amino-4:5-dioxyanthraquinone, 1 part of boric acid and 4 parts of orthotoluidine are heated at 170-180° C. for 2-3 hours. On cooling the new dyestuff separates in crystalline form and is filtered off, and washed first with methylated spirit and then with water, and dried.

Example 3

To dye 10 kilograms of cellulose acetate knit fabric a blue shade:—

1 kilogram of a paste consisting of one part of finely divided 1-amino-4-anilido-5-oxy-anthraquinone, 6 parts of water and 3 parts of Turkey red oil (50%) is heated to the boil with 10 litres of 2.5 g. p. l. soap solution with stirring, and strained through a filter cloth into a dyebath containing 300 litres of 2.5 g. p. l. soap solution. The previously scoured cellulose acetate fabric is now entered in rope form, and dyeing commenced cold or lukewarm, the temperature being raised slowly to 80° C. and maintained thereat for 1½ hours or until the requisite shade is achieved. The goods are now washed off thoroughly and dried or otherwise treated as desired or requisite.

For printing cellulose acetate goods the dyestuff paste is suitably diluted and thickened with a gum thickening paste which may also contain swelling agents for the cellulose acetate, e. g. methylated spirits. Printing, drying, steaming, etc. may then be effected according to known technique.

What we claim and desire to secure by Letters Patent is:—

1. A process for the production of an anthraquinone compound of the general formula:—

wherein A represents anthraquinone substituted in three α-positions by three substituents, X, Y and Z, of which X represents a hydroxyl group, Y an arylamino group and Z a group selected from the class consisting of free amino groups and aliphatically substituted amino groups, from anthraquinone substituted in the 1-position by a group selected from the class consisting of free amino groups and aliphatically substituted amino groups, in the 5-position by a hydroxyl group and in the 4-position by a substituent capable of replacement by arylamino by the action of an aromatic amine, which comprises effecting replacement of said replaceable substituents by the action of an aromatic amine.

2. A process for the production of a 1-amino-4-arylamino-5-hydroxy-anthraquinone which comprises subjecting a 1-amino-5-hydroxy-anthraquinone substituted in the 4-position by a substituent capable of replacement by arylamino by the action of an arylamine, to replacement of said substituent by arylamino by the action of an arylamine.

3. Process for the production of anthraquinone substituted in the 1-position by an aliphatically substituted amino group, in the 5-position by a hydroxyl group and in the 4-position by an arylamino group which comprises subjecting a 1-aliphatically-substituted-amino-5-hydroxy-anthraquinone substituted in the 4-position by a reactive group selected from nitro, alkoxy, hydroxy and halogen to replacement of said reactive group by arylamino by the action of an arylamine.

4. Process for the production of 1-amino-4-arylamino-5-hydroxy-anthraquinone which comprises subjecting a 4-amino-chrysazin to the action of an arylamine.

5. Process for the production of 1-alkylamino-4-arylamino-5-hydroxy-anthraquinone which comprises subjecting 4-alkylamino-chrysazin to the action of an arylamine.

6. Process for the production of 1-amino-4-phenyl-amino-5-hydroxy-anthraquinone which comprises subjecting 4-amino-chrysazin to the action of aniline in the presence of boric acid.

7. As a new product, an anthraquinone compound of the general formula:—

wherein A represents anthraquinone substituted in three α-positions by three substituents, X, Y, Z, of which X represents a hydroxyl group, Y an arylamino group and Z a group selected from the class consisting of free amino groups and aliphatically substituted amino groups.

8. As a new product, 1-amino-4-arylamino-5-hydroxy-anthraquinone.

9. As a new product, 1-aliphatically-substituted-amino-4-arylamino-5-hydroxy-anthraquinone.

10. As a new product, 1-amino-4-arylamino-5-hydroxy-anthraquinone wherein the arylamino group is of the benzene series.

11. As a new product, 1-aliphatically-substituted-amino-4-arylamino-5-hydroxy-anthraquinone wherein the arylamino group is of the benzene series.

12. As a new product, 1-amino-4-phenylamino-5-hydroxy-anthraquinone.

GEORGE HOLLAND ELLIS.
FRANK BROWN.